(12) United States Patent
Li et al.

(10) Patent No.: US 7,375,911 B1
(45) Date of Patent: May 20, 2008

(54) PIEZOELECTRIC ACTUATOR AND SENSOR FOR DISK DRIVE DUAL-STAGE SERVO SYSTEMS

(75) Inventors: Yunfeng Li, San Jose, CA (US); Wei Guo, Fremont, CA (US); Lin Guo, Saratoga, CA (US); Yu Sun, Fremont, CA (US)

(73) Assignee: Maxtor Corporation, Scotts Valley, CA (US)

( * ) Notice: Subject to any disclaimer, the term of this patent is extended or adjusted under 35 U.S.C. 154(b) by 178 days.

(21) Appl. No.: 10/996,543

(22) Filed: Nov. 24, 2004

Related U.S. Application Data

(60) Provisional application No. 60/525,072, filed on Nov. 25, 2003.

(51) Int. Cl.
| | |
|---|---|
| G11B 21/02 | (2006.01) |
| G11B 5/596 | (2006.01) |
| G11B 17/00 | (2006.01) |
| G11B 33/14 | (2006.01) |
| G11B 21/24 | (2006.01) |

(52) U.S. Cl. .................. 360/75; 360/78.12; 360/97.01; 360/97.02; 360/294.4

(58) Field of Classification Search ...... None
See application file for complete search history.

(56) References Cited

U.S. PATENT DOCUMENTS

| | | | |
|---|---|---|---|
| 5,978,167 A | 11/1999 | Abe | |
| 5,982,573 A | 11/1999 | Henze | |
| 6,100,623 A * | 8/2000 | Huang et al. | 310/317 |
| 6,166,874 A * | 12/2000 | Kim | 360/75 |
| 6,310,746 B1* | 10/2001 | Hawwa et al. | 360/97.01 |
| 6,515,834 B1 | 2/2003 | Murphy | |
| 6,545,846 B1 | 4/2003 | Chee et al. | |
| 6,584,660 B1* | 7/2003 | Shimogawa et al. | 29/25.35 |
| 6,744,577 B1 | 6/2004 | Guo et al. | |
| 2001/0012172 A1 | 8/2001 | Hawwa et al. | |
| 2002/0067565 A1 | 6/2002 | Keleman | |
| 2002/0101681 A1 | 8/2002 | He et al. | |
| 2003/0011914 A1 | 1/2003 | Angelo et al. | |

(Continued)

OTHER PUBLICATIONS

Dosch and Inman, "A Self-Sensing Piezoelectric Actuator for Collocated Control" *J. Intell. Mater. Syst. Struct.*, 3:166-185 (1992).

(Continued)

*Primary Examiner*—Thang V. Tran
*Assistant Examiner*—Daniell L. Negrón
(74) *Attorney, Agent, or Firm*—David K. Lucente

(57) ABSTRACT

A hard disk drive is disclosed comprising at least one disk rotatable about an axis, an actuator assembly moveable relative to the disk, a transducer positioned on the actuator assembly, an actuator signal line, a piezoelectric actuator element disposed on the actuator assembly and electrically interconnected to the actuator signal line, a processor, a sensor signal line and a piezoelectric sensor element for sensing a vibration. The piezoelectric sensor element is collocated with the piezoelectric actuator element and electrically interconnected to the processor by the sensor signal line. The piezoelectric actuator element is operable to move the at least one transducer relative to a surface of the disk. The piezoelectric sensor element is electrically isolated from the piezoelectric actuator element. A method for detecting a vibration in a hard disk drive actuator assembly is also disclosed.

59 Claims, 8 Drawing Sheets

U.S. PATENT DOCUMENTS

2004/0051422 A1* 3/2004 Kashiwaya et al. ......... 310/324

OTHER PUBLICATIONS

Evans and Griesbach, "Piezoelectric Microactuator for Dual Stage Control" *IEEE Transactions on Magnetics*, 35(2):977-982 (1999).

Kuwajima and Matsuoka, "Thin-Film Piezoelectric DSA for HDD" *IEEE Transactions on Magnetics*, 38(5):2186-2188 (2002).

Li et al., "Vibration Control of a PZT Actuated Suspension Dual-Stage Servo System Using a PZT Sensor" *IEEE Transactions on Magnetics*, 39(2):932-937 (2003).

* cited by examiner

PIEZOELECTRIC ACTUATOR AND SENSOR FOR DISK DRIVE DUAL-STAGE SERVO SYSTEMS

CROSS-REFERENCE TO RELATED APPLICATIONS

This application claims the benefit of U.S. Provisional Patent Application Ser. No. 60/525,072, filed Nov. 25, 2003, the entire disclosure of which is hereby incorporated by reference herein.

FIELD OF THE INVENTION

The present invention relates to active vibration sensing and control in a dual-actuator servo system for hard disk drives. More particularly, the present invention is directed to use of a thin-film piezoelectric element in a hard drive for sensing vibration and for effecting movement of an actuator assembly.

BACKGROUND OF THE INVENTION

A hard disk drive typically includes one or more magnetic disks rotatably mounted in association with a spindle and one or more actuator assemblies for positioning a transducer or head relative to data tracks on the surface of each disk. The actuator assembly typically comprises a pivotable arm, a load beam or suspension arm affixed to the pivotable arm, a flexure at the distal end of the load beam and a slider and transducer or head assembly affixed to the flexure. A voice coil motor induces movement of the actuator assembly to position the head relative to the disk surface. Typically, the voice coil motor operates in association with a servo system to provide both gross positioning of the head, i.e., track to track positioning, and fine positioning, i.e., track following. Recently, piezoelectric elements have been incorporated into actuator assemblies to provide fine positioning of the head assembly for track following purposes, rather than only relying upon the voice coil motor for fine positioning.

With the emphasis on making hard drives smaller for numerous applications including portable computers, magnetic disks are not only becoming smaller, but data tracks are becoming increasingly more densely positioned on the disks and the tracks themselves are becoming physically narrower. As a result, maintaining the transducer or head in an accurate track following position for purposes of reading and writing is becoming more difficult. To accommodate increasingly finer adjustments in the position of the magnetic head, dual positionable actuator assemblies have been introduced. In a first mode, a voice coil motor will move the actuator assembly from track to track. In a second mode, the voice coil motor together with a piezoelectric element positioned on the actuator assembly will provide fine positioning of the head assembly. In particular, by supplying a voltage to the piezoelectric element, the piezoelectric element can expand and contract in a controlled manner to adjust the distal end of the actuator arm and thereby accurately maintain the position of the head relative to the tracks on the disk surface.

The dual-stage actuator assembly including both a voice coil motor and a piezoelectric actuator can maintain more accurate position of the magnetic head during track following control than a single-stage actuator assembly, e.g., the voice coil motor alone. However, vibrations due to mechanical resonance modes of the actuator assembly, including the voice coil motor and the piezoelectric actuator, limit further improvement of the head positioning control accuracy. In particular, the resonance modes of the actuator assembly limit the attainable track following servo control bandwidth. Furthermore, the vibration of these resonance modes, excited by air turbulence and gross positioning commands (e.g., seek control commands) executed during fast and/or relatively large track-to-track seeking, is a major source of head off-track position errors.

The piezoelectric material used for the piezoelectric actuator has also been used to detect vibrations and/or shocks affecting the actuator assembly. In U.S. Pat. No. 6,100,628 issued to Huang et al., for example, a dual-purpose, bulk piezoelectric element provides for fine positioning of a head assembly relative to a surface of a disk of a hard disk drive and for sensing vibrations affecting the actuator assembly. Since the same piezoelectric element is used both for actuation and sensing, however, the sensor signal must be extracted from the driving signal applied to the piezoelectric element for positioning the head assembly. Thus, discriminator and/or filtering circuitry is required to separate the sensor signal from the driving signal. This not only increases the system cost, but can also degrade the performance of the sensor when there is feed-through of the driving signal to the sensor signal.

SUMMARY OF THE INVENTION

The present invention addresses and solves these and other problems and disadvantages of the prior art by utilizing an independent piezoelectric sensor element to detect vibration collocated with a piezoelectric actuator element to actively control vibration. For the purposes of the present invention, the term "collocated" means that the actuator and sensor elements are placed together on a common assembly, although they may be on separate parts of the assembly. Use of independent sensing and actuating piezoelectric elements allows for detection of the sensed vibration without requiring complex discrimination and/or filtration of a driving signal applied to the actuating element. Direct measurement of vibration allows for more accurate detection of vibration. The use of the more accurate detection in canceling or compensating for the vibration improves performance and reduces the possibility of track encroachment, i.e. writing information to and/or reading information from an incorrect or unintended location. In addition, the collocated piezoelectric actuator and vibration sensor can be fabricated simultaneously using the same thin-film process to reduce the cost and to simplify the integration process.

In one embodiment of the present invention, a hard disk drive is provided comprising at least one disk rotatable about an axis, an actuator assembly moveable relative to the disk, a transducer positioned on the actuator assembly, an actuator signal line, a piezoelectric actuator element disposed on the actuator assembly and electrically interconnected to the actuator signal line, a processor, a sensor signal line and a piezoelectric sensor element collocated with the piezoelectric actuator element and electrically interconnected to the processor by the sensor signal line. The piezoelectric actuator element is operable to move the at least one transducer relative to a surface of the disk. The piezoelectric sensor element is electrically isolated from the piezoelectric actuator element. The piezoelectric sensor element senses vibration imparted to the actuator, and produces a responsive signal that is processed. The piezoelectric actuator element is then utilized to adjust the position of the transducer.

In another embodiment of the present invention, a method for detecting vibration in a hard disk drive actuator assembly is provided. In this method, an actuation signal is sent over a first signal line to control at least a first piezoelectric actuator element for positioning a transducer head of a disk drive with respect to a disk of the disk drive. A sensor signal is also received over a second signal line from at least a first piezoelectric sensor element. The at least a first piezoelectric sensor element is electrically isolated from the at least a first piezoelectric actuator element. The sensor signal is used to determine whether a vibration has been detected by the piezoelectric sensor element.

In a further embodiment, the method further utilizes the sensor signal to provide active control of the actuator assembly to compensate for the vibration detected.

DETAILED DESCRIPTION

The present invention advantageously utilizes the physics of piezoelectric elements in which movement is generated when a charge is applied across a piezoelectric element and, conversely, a voltage is generated when a motion is forced on a piezoelectric element. Although certain embodiments are disclosed and described in terms of controlled charge and sensed voltage, a person of skill in the art will recognize that voltage could be controlled and charge sensed with the same result. The present invention is not intended to be limited to a charge controlled piezoelectric system. Rather, it is intended to cover any use of a piezoelectric element or its equivalent.

A piezoelectric element comprises a crystal or quartz structure. Compression of the element generates an electrostatic voltage across it and conversely, application of an electric field causes the crystal to expand or contract. The polarization of a piezoelectric crystal is parallel to the axes of the crystal. The magnitude of the polarization is proportional to the stress and/or strain (compression and/or tension) applied to the crystal. Importantly, the direction of the polarization is reversed when the strain changes from compression to tension, and vice versa. For example, if a piezoelectric element is subjected to an alternating voltage, it will alternatively expand and contract. Conversely, subjecting the piezoelectric element to alternating tension and compression forces will generate a voltage, but in opposite directions.

Figure 1:
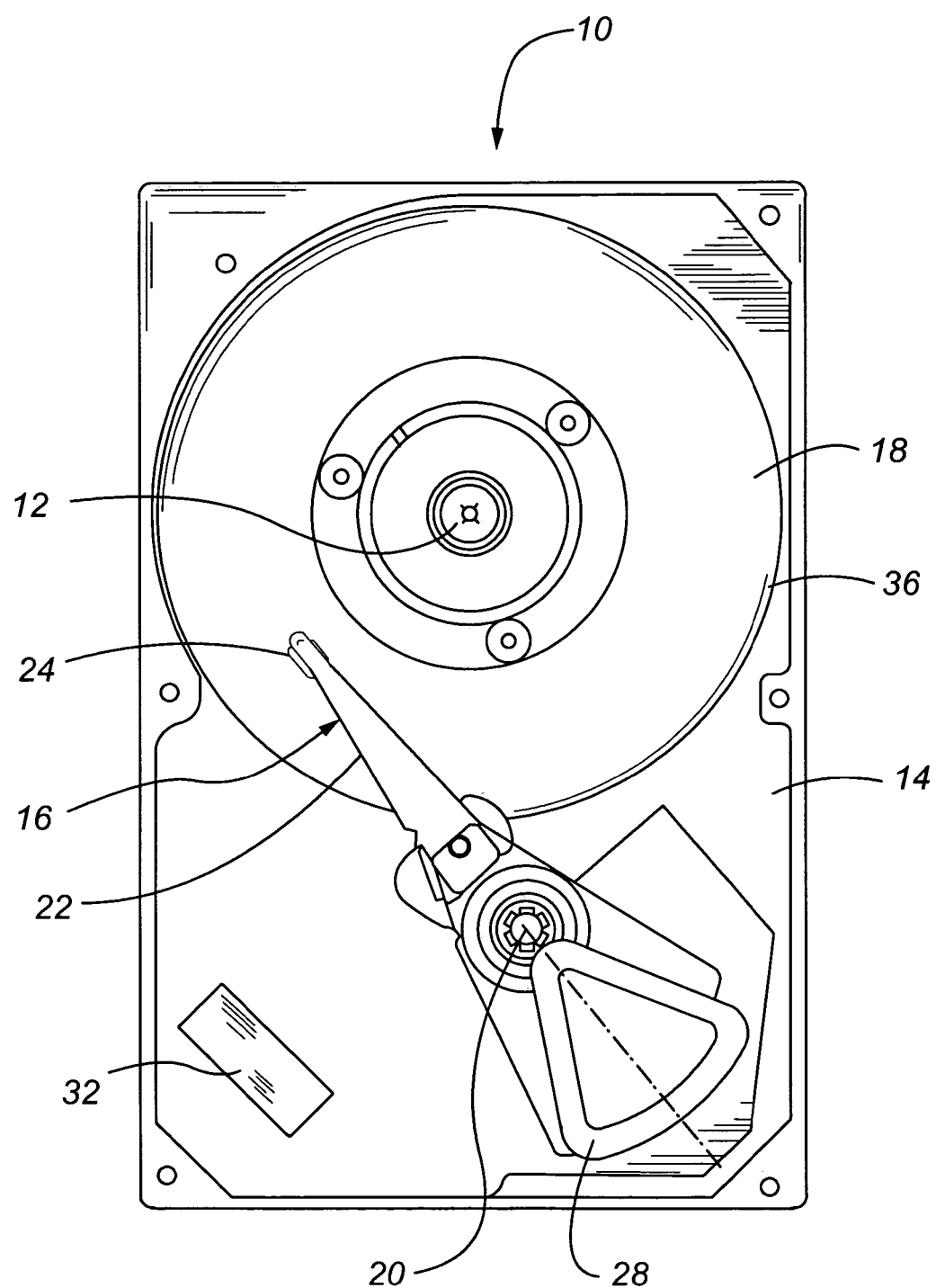
FIG. 1 shows a top plan view of a disk drive.

FIG. 1 illustrates a typical computer disk drive 10. The disk drive 10 generally includes a base plate 14, one or more magnetic disk(s) 18 (only one of which is shown in FIG. 1), and an actuator assembly 16. The one or more magnetic disk(s) 18 are interconnected to the base plate 14 by a spindle motor mounted within or beneath the hub 12, such that the one or more disk(s) 18 can be rotated relative to the base plate 14. The actuator assembly 16 comprises at least one actuator arm 22 for each magnetic disk 18. Each actuator arm 22 is pivotally mounted relative to the base plate 14 by a bearing assembly 20. A transducer head 24 is disposed at a first end of each actuator arm 22 to address a surface of the corresponding magnetic disk 18.

The actuator assembly 16 further comprises a coarse actuator 28, such as a voice coil motor, located at a second end of each actuator arm 22, that pivots the actuator assembly 16 about the bearing assembly 20, in cooperation with one or more permanent magnets (not shown) in response to control signals received from a disk drive controller 32 to radially position the transducer head 24 with respect to the magnetic disk 18. By changing the radial position of the transducer head 24 with respect to the magnetic disk 18, the transducer head 24 can access different data tracks 36 on the magnetic disk 18. The disk drive controller 32 may be implemented by a programmable processor, including a digital signal processor (DSP).

The transducer head 24 operates by sensing the magnetic flux transitions encoded in the disk 18 by a write operation. In order to sense the magnetic transitions, the transducer head 24 is held in close proximity to the track 36 containing the desired information. The magnetic disk 18 is rotated under the transducer head 24, and the flux transitions are read by the head 24. As can be appreciated, during read operations, it is important to maintain the transducer head 24 over the desired portion of the track 36, such as the centerline, to maximize the signal produced in the transducer head 24 by the passage of magnetic transitions written to the track 36.

Similarly, during write operations, it is important to maintain the position of the transducer head 24 over the desired portion of the track 36, such as the centerline. If the position of the transducer head 24 with respect to the track 36 is allowed to deviate from the desired position, there is a risk that data in adjacent tracks will be overwritten, or a risk that the data written to the track 36 will not be retrievable during future read operations, because the data will not be in the expected position.

Figure 2:
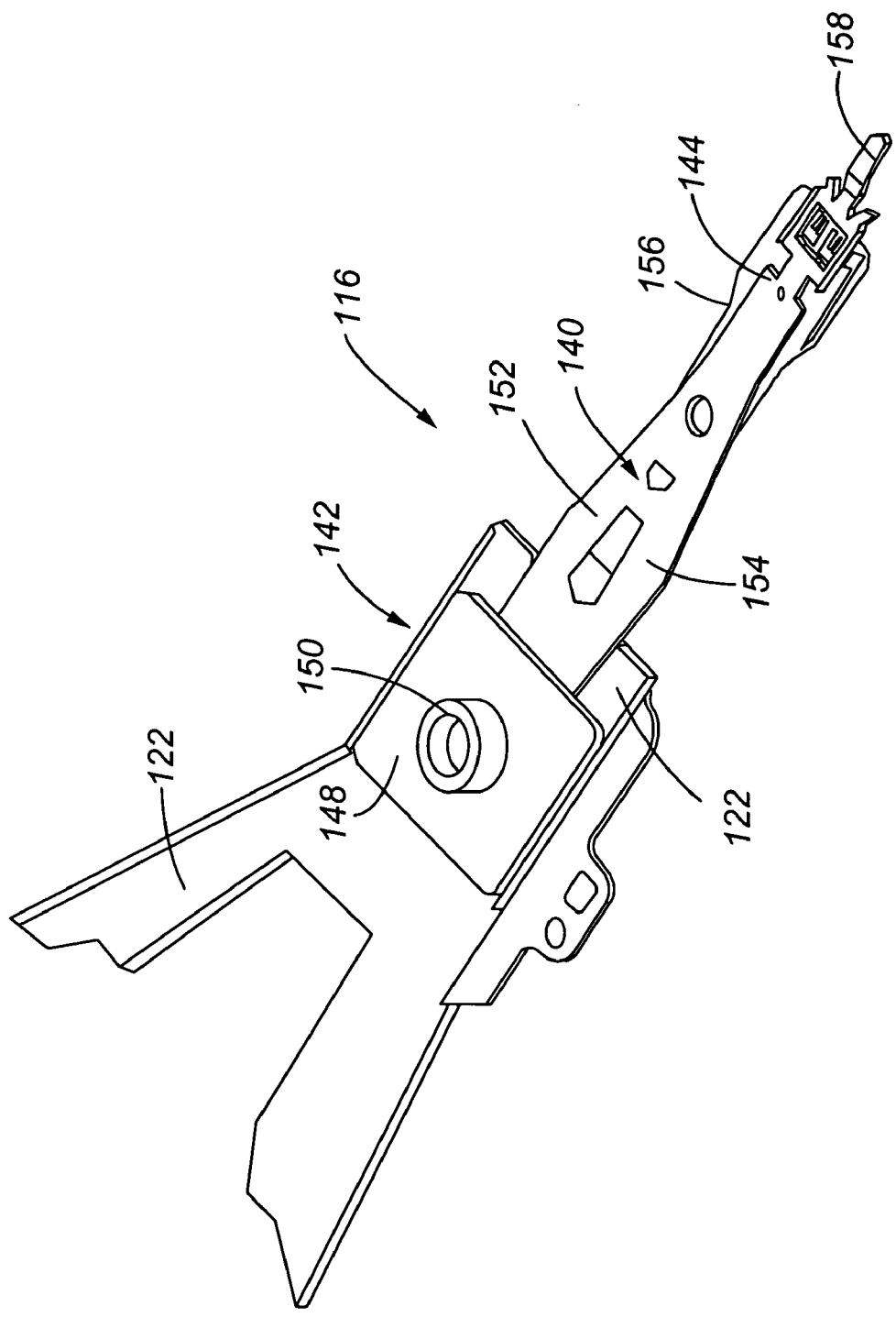
FIG. 2 shows a perspective view of an actuator assembly for a disk drive, such as the disk drive shown in FIG. 1.

FIG. 2 shows a perspective view of an embodiment of an actuator assembly 116 that may be used in connection with embodiments of the present invention. In the embodiment shown in FIG. 2, for example, the actuator assembly 116 is pivotally mounted to the base plate 14 of the disk drive 10 and comprises an actuator arm 122, a suspension load beam 140 attached to the actuator arm 122 at a secured end portion 142, and a flexure member 156 attached to a suspended end portion 144 of the suspension load beam 140 opposite the first secured end portion 142. The suspension load beam 140 extends outwardly from the actuator arm 122 in a cantilevered fashion. Attachment of the suspension load beam 140 to the actuator arm 122 may be accomplished by swaging, although other methods of attachment known to those of skill in the art could be used. More particularly, a swage plate 148 with a cylindrical portion or bushing 150 is positioned in a complementary hole (not shown) in the proximal end of an actuator arm 122 and the adjacent metal surfaces are swaged or joined together. A pair of arm segments 152 and 154 may be included as part of the suspension load beam 140. As described below with respect to FIGS. 3 and 4, the flexure member 156 supports a piezoelectric actuator and sensor assembly 160 (see FIGS. 3 and 4) and a slider 162 including a transducer head 124. Accordingly, the actuator assembly 116 comprises a dual stage actuator assembly. An extension member 158 cooperates with an on-off ramp for parking the transducer head 124 when the disk drive 10 is not in use.

Figure 3:
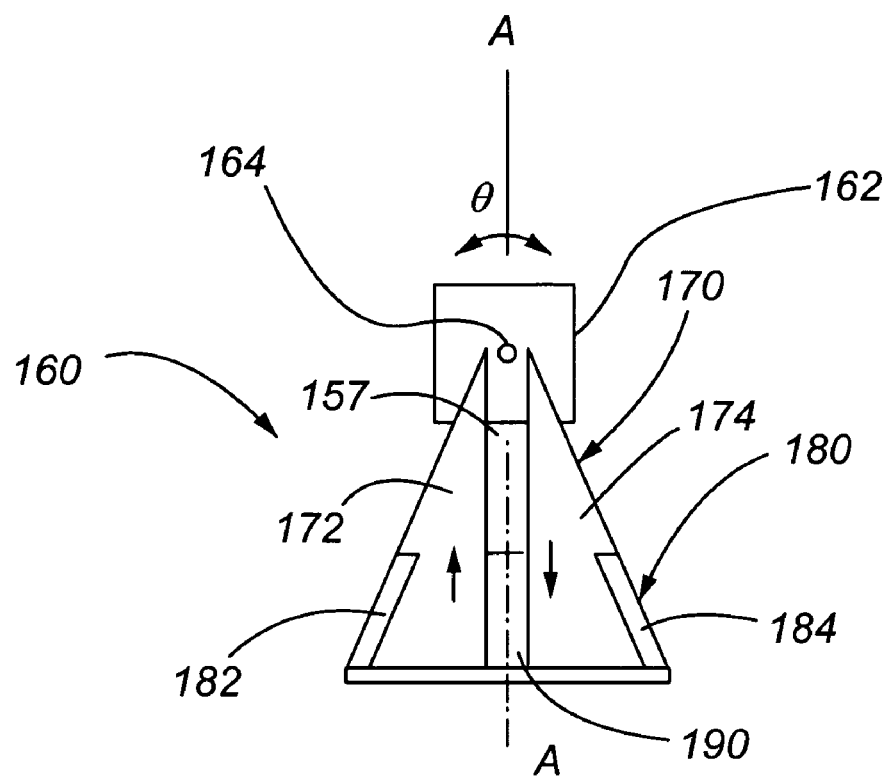
FIG. 3 shows an embodiment of a thin-film piezoelectric actuator and sensor assembly of the present invention.

FIG. 3 shows a plan view of an embodiment of a piezoelectric actuator and sensor assembly 160 that provides fine positioning of the slider 162 and transducer 124 (shown in FIG. 4) with respect to a magnetic disk (e.g., the magnetic disk 18 shown in FIG. 1) of a disk drive and that detects vibrations experienced by the actuator assembly of the disk drive. The piezoelectric actuator and sensor assembly 160 comprises at least one piezoelectric actuator element 170 and at least one piezoelectric sensor element 180. The piezoelectric actuator element 170, in this embodiment, comprises two piezoelectric actuator films 172 and 174 having generally the same physical configuration and properties. Accordingly, a symmetrical driving or positioning configuration may be achieved by operating one of the piezoelectric actuator films 172 or 174 to expand and the other to contract. By oppositely controlling the piezoelectric actuator films 172 and 174, the stroke available from the piezoelectric actuator 170 is greater than from at least some other configurations. While the piezoelectric actuator element 170 shown in FIG. 3 comprises a pair of piezoelectric actuator films 172 and 174, other configurations are possible such as a single piezoelectric actuator film or more than two piezoelectric actuator films.

In the embodiment shown in FIG. 3, the piezoelectric actuator films 172 and 174 are positioned with opposed polarizations and are electrically connected to each other by an electrical connection (e.g., a planar transmission line, a conductive layer or a wire) and are further electrically connected to a processor, for example, on a printed circuit board of the disk drive 10. The printed circuit board is typically positioned on the opposite side of or underneath the base plate 14, such as shown in FIG. 1. Communication occurs between the transducer and piezoelectric elements, on one hand, and controllers and/or processors on the printed circuit board, on the other hand, through a flex circuit (not shown). Controller 32 is added to FIG. 1 for illustrative purposes. In this manner, voltage can be equally applied simultaneously across both piezoelectric actuator films 172 and 174 to induce movement in the actuator films to cause adjustment of the position of the magnetic head relative to the surface of the disk. More particularly, because the two piezoelectric actuator films 172 and 174 of this embodiment are positioned with opposed polarities, application of a uniform voltage or current will cause the piezoelectric actuator films 172 and 174 to move in opposite directions, with one actuator film contracting and the other actuator film expanding the same amount.

The correlation between the amount of voltage to be applied for a given quantity of movement is known such that an algorithm resident within a processor or controller 32 can actually determine the amount of voltage to be applied for purposes of generating the appropriate movement necessary to maintain track following based upon servo feedback. Thus, the piezoelectric actuator element 170 may be used for maintaining the fine position of the magnetic head over a desired track.

The piezoelectric actuator element 170 may be manufactured by any thin-film manufacturing technology known in the art. Piezoelectric material, for example, may be deposited on a substrate (e.g., via sputter deposition) and etched to form individual actuator films 172 and 174. One example of producing a thin-film piezoelectric actuator element for use within the scope of the present invention is described in Kuwajima and Matsuoka, Thin-Film Piezoelectric DSA for HDD, IEEE Transactions on Magnetics, Vol. 38, No. 5, pp. 2186-2188 (September 2002). Further, the piezoelectric actuator films 172 and 174 may be deposited on a single substrate, with a gap or slot 157 formed in the substrate to allow the piezoelectric actuator films 172 and 174 to flex, or may be deposited on separate substrates that are attached to a flexure element 156 (see FIG. 4) on either side of the dimple 164 extending between the suspension load beam 140 and the slider 162.

Referring to FIG. 3, the piezoelectric sensor element 180 may comprise a pair of piezoelectric sensor films 182 and 184 for detecting vibration, such as certain resonance modes of the actuator assembly 116. While the embodiment shown in FIG. 3 comprises a pair of piezoelectric sensor films 182 and 184, other configurations are possible such as a single sensor element, or more than two sensor elements. The piezoelectric sensor films 182 and 184 may comprise thin-film piezoelectric structures that are independent elements from the piezoelectric actuator films 172 and 174, but are collocated with the piezoelectric actuator films 172 and 174. In the embodiment shown in FIG. 3, for example, the piezoelectric sensor films 182 and 184 are collocated with the piezoelectric actuator films 172 and 174 in that they are formed on the same substrate 190 as the piezoelectric actuator films 172 and 174, but are electrically isolated from the actuator films, such as by etching or by providing an isolation barrier (e.g., a non-conductive material, such as a dielectric, glue or oxide) disposed between the piezoelectric films. In such an embodiment, the piezoelectric sensor films 182 and 184 can be manufactured during the same processing steps as the actuator films 172 and 174 (e.g., sputter deposition and etching). Accordingly, the costs of manufacturing can be less than that for manufacturing piezoelectric films on separate substrates.

In the embodiment shown in FIG. 3, the piezoelectric sensor films 182 and 184 are located on opposite sides and symmetric about a center-line A-A of the substrate 190. Thus, the piezoelectric sensor films 182 and 184 may be configured as a differential sensor in which the signal of one piezoelectric film 182 is subtracted from the signal of the other piezoelectric film 184 to distinguish between in-plane modes and out-of-plane modes of vibration.

Figure 4:
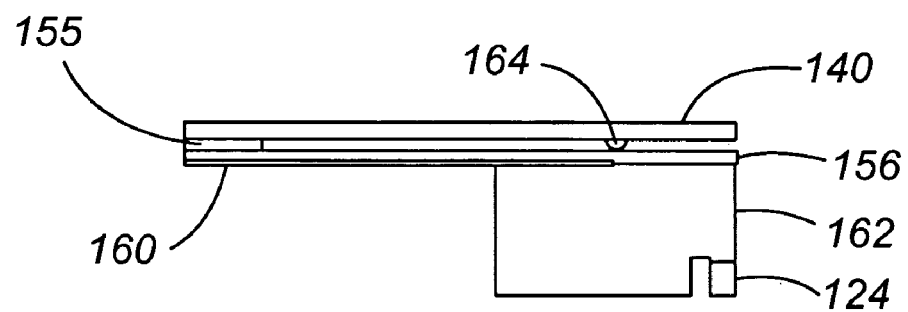
FIG. 4 shows a side view of the actuator assembly shown in FIG. 3.

FIG. 4 shows a side view of an embodiment of an actuator assembly 116 comprising the piezoelectric actuator and sensor assembly 160 shown in FIG. 3. In such an embodiment, the actuator assembly 116 comprises a suspension load beam 140, a flexure member 156 supported by the suspension load beam 140, the piezoelectric actuator and sensor assembly 160 supported by the flexure member 156 and a slider 162 supported by the flexure member 156 and the piezoelectric actuator and sensor assembly 160. The slider 162, in turn, supports a transducer head 124 that writes data to and reads data from a disk. The slider 162 is movable about a dimple 164 extending from the suspension load beam 140.

The flexure member 156 is supported by the suspension load beam 140, such as at an attachment point 155 (e.g., by bonding, fusion or other attachment means), and the piezoelectric actuator and sensor assembly 160 is attached to the flexure (e.g., by bonding, fusion or other attachment means). The slider 162 is supported by the flexure member 156 and is guided, as described above, by the piezoelectric actuator and sensor assembly 160. The piezoelectric actuator and sensor assembly 160 extends to a location proximate the dimple 164 and is attached to the slider 162 on both sides of the dimple 164 so that the piezoelectric actuator and sensor assembly 160 can provide positioning control of the slider 162 with respect to the disk by rotating the slider 162 about the dimple 164.

Figure 5A:
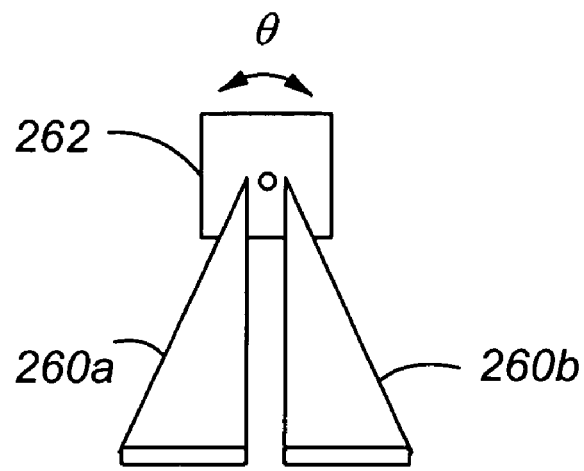
FIG. 5A shows a top view of another embodiment of a thin-film piezoelectric actuator and sensor assembly of the present invention.
Figure 5B:
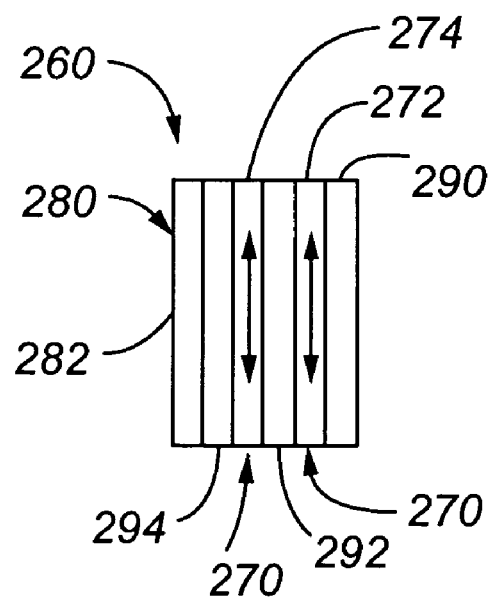
FIG. 5B shows a side view of the actuator assembly shown in FIG. 5A.

FIGS. 5A and 5B show another embodiment of a pair of discrete piezoelectric actuator and sensor assemblies 260A and 260B for rotating a slider 262 including a transducer head of an actuator assembly (e.g., the actuator assembly 116 shown in FIG. 2). FIG. 5A shows a top view of the piezoelectric actuator assembly 260, and FIG. 5B shows a side view of one of the piezoelectric actuator and sensor assemblies 260 shown in FIG. 5A. In this embodiment, the pair of discrete piezoelectric actuator and sensor assemblies 260A and 260B is disposed intermediate a flexure (e.g., the flexure 156 shown in FIG. 2) and the slider 262 to rotate the slider 262. As shown in FIG. 5B, each piezoelectric actuator and sensor assembly 260A, 260B comprises a piezoelectric actuator element 270 collocated with a piezoelectric sensor element 280. In such an embodiment, the piezoelectric actuator element 270 comprises a pair of piezoelectric actuator films 272 and 274 formed as two layers of a piezoelectric film on a substrate 290. The piezoelectric actuator films 272 and 274 are separated by a first isolation layer 292, which may be formed by any non-conductive layer known in the art (e.g., a dielectric, glue or oxide). The piezoelectric actuator films 272 and 274 have generally the same physical configuration and properties and are electrically connected to each other by an electrical connection (e.g., a planar transmission line, a conductive layer or a wire). The piezoelectric actuator films 272 and 274 of the left and right multi-layer piezoelectric actuator and sensor assemblies 260A, 260B are further electrically connected to a processor (e.g., within the disk drive controller 32 shown in FIG. 1), for example on a printed circuit board of the disk drive 10, so that voltage can be equally applied simultaneously across both piezoelectric actuator films 272 and 274 to induce movement in the actuator films to cause adjustment of the position of the magnetic head relative to the surface of the disk. As shown in FIG. 5B, the piezoelectric actuator films 272 and 274 of the piezoelectric actuator and sensor assembly 260A contract or expand in unison, and the piezoelectric actuator films of the other piezoelectric actuator and sensor assembly 260B expand or contract, respectively, in unison with each other and opposite of the piezoelectric actuator films 272 and 274 shown in FIG. 5B to rotate the slider.

The piezoelectric sensor element 280 comprises a third layer of piezoelectric film forming a piezoelectric sensor film 282. The piezoelectric sensor film 282 is isolated from the second piezoelectric actuator film 274 by a second isolation layer 294. The piezoelectric sensor element 280 is electrically isolated from the piezoelectric actuator element 270 so that a driving signal applied to the actuator element 270 is not applied to the piezoelectric sensor element 280. The piezoelectric sensor film 282 is electrically connected to a processor (e.g., the controller 32 shown in FIG. 1), for example, on a printed circuit board of the disk drive 10 via a sensor signal line and provides a sensor vibration signal to that processor via the sensor signal line. Since the piezoelectric sensor film 282 is electrically isolated from the piezoelectric actuator films 272 and 274 and provides a sensor signal to a processor via a separate sensor signal line, the sensor signal is not combined with an actuator driving signal. Thus, complex discrimination and/or filter circuitry is not required to separate the sensor signal from the driving signal as is required in the prior art.

Figure 8:
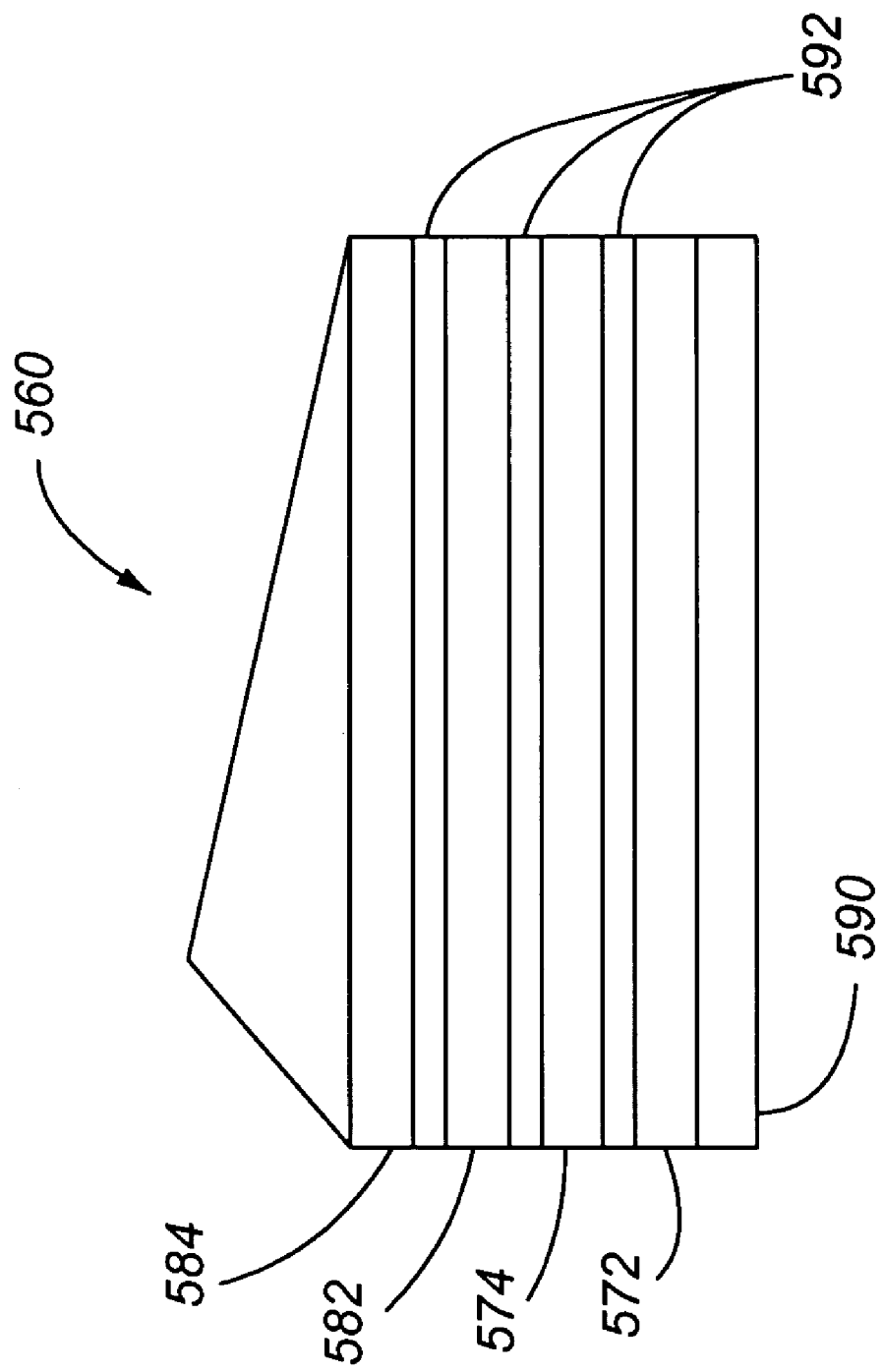
FIG. 8 shows a side, perspective view of another embodiment of a piezoelectric actuator and sensor assembly.

While the embodiment shown in FIGS. 5A and 5B shows a pair of piezoelectric actuator and sensor assemblies 260A and 260B disposed intermediate a flexure and the slider 262, other configurations are possible. For example, a single piezoelectric actuator and sensor assembly may be used. In such an embodiment, as shown in FIG. 8, the piezoelectric actuator and sensor assembly 560 may comprise a substrate 590 supporting a pair of piezoelectric actuator films 572 and 574 and a pair of piezoelectric sensor films 582 and 584. The pair of piezoelectric actuator films 572 and 574 and the pair of piezoelectric sensor films 582 and 584 are disposed in separate layers from each other and are separated by isolation layers 592. The pair of piezoelectric sensor films 582 and 584 may be configured in a differential sensor configuration as described above. In another embodiment, more than two piezoelectric actuator and sensor assemblies may be used.

The embodiments shown in FIGS. 3, 4, 5A and 5B comprise merely two examples of collocated piezoelectric actuator elements and piezoelectric sensor elements. In both examples, the piezoelectric actuator elements and the piezoelectric sensor elements are collocated on a single substrate in one or more layers of piezoelectric material (e.g., a piezoelectric film) and electrically isolated from each other by an isolation barrier.

In the embodiment of FIG. 3, for example, the piezoelectric actuator element 170 and the piezoelectric sensor element 180 comprise piezoelectric films formed in a single layer of piezoelectric material disposed on a substrate. The piezoelectric films are defined and separated from each other such as by etching or providing other isolation barriers (e.g., non-conductive materials such as oxide) disposed between the piezoelectric films.

Figure 9:
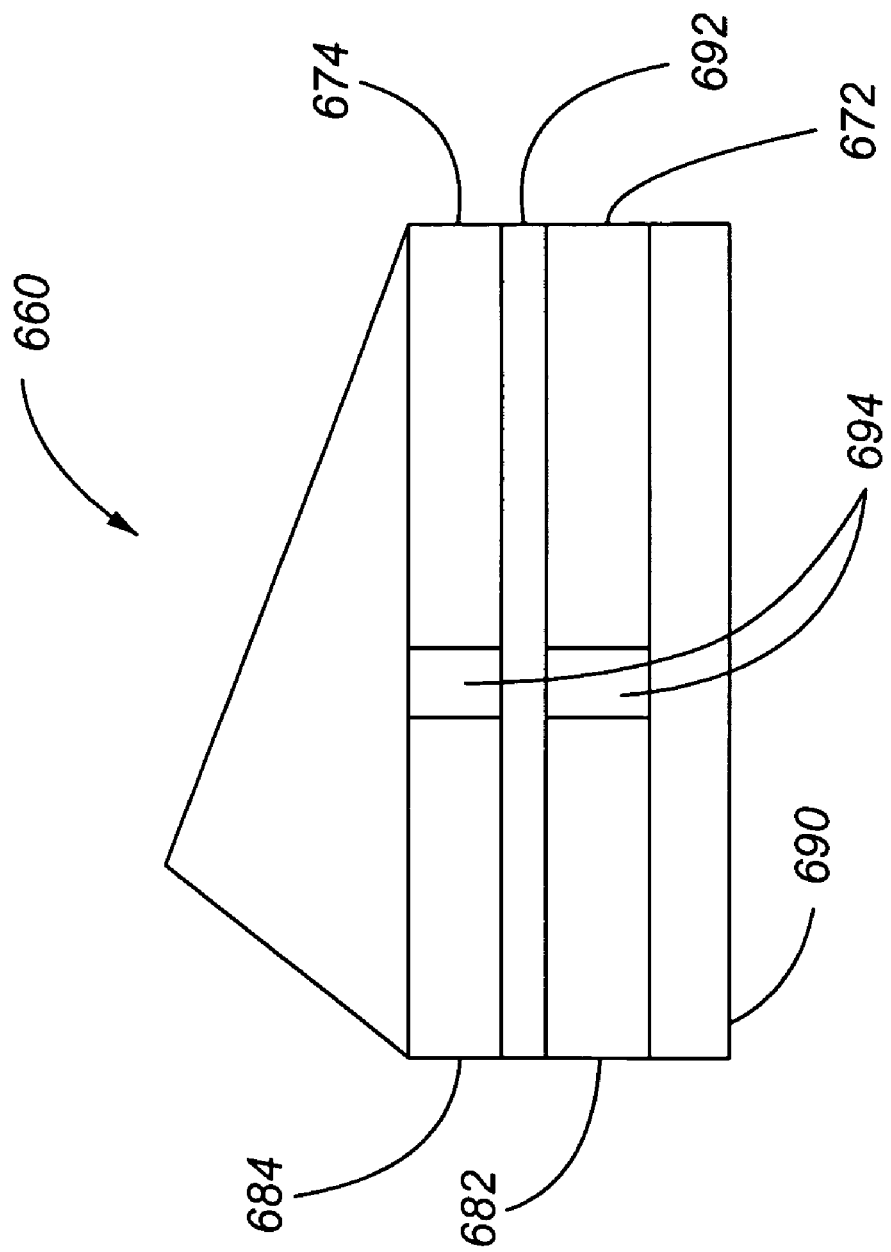
FIG. 9 shows a side, perspective view of yet another embodiment of a piezoelectric actuator and sensor assembly.

In the embodiment shown in FIGS. 5A and 5B, however, the piezoelectric actuator films and the piezoelectric sensor film are formed by separate layers of piezoelectric film disposed on a common substrate. Although the piezoelectric films are all shown as distinct layers in FIG. 5B, an embodiment of a piezoelectric element having multiple layers of piezoelectric films may comprise one or more layer(s) comprising multiple piezoelectric films formed by a single layer of piezoelectric material. As shown in FIG. 9, for example, a multi-layer piezoelectric actuator and sensor assembly 660 may comprise a substrate 690 supporting a first layer of piezoelectric film comprising a first piezoelectric actuator film 672 and a first piezoelectric sensor film 682 and a second layer of piezoelectric film comprising a second piezoelectric actuator film 674 and a second piezoelectric sensor film 684. The first piezoelectric actuator film 672 and the first piezoelectric sensor film 682 in the first layer and the second piezoelectric actuator film 674 and the second piezoelectric sensor film 684 are electrically isolated from each other via isolation barriers 694. The layers of piezoelectric film are further isolated from each other via an isolation layer 692. In another embodiment, the first layer of piezoelectric material may comprise first and second piezoelectric actuator films; the second layer of piezoelectric material may comprise first and second sensor films. Other configurations of layers of piezoelectric material are also possible.

Figure 6:
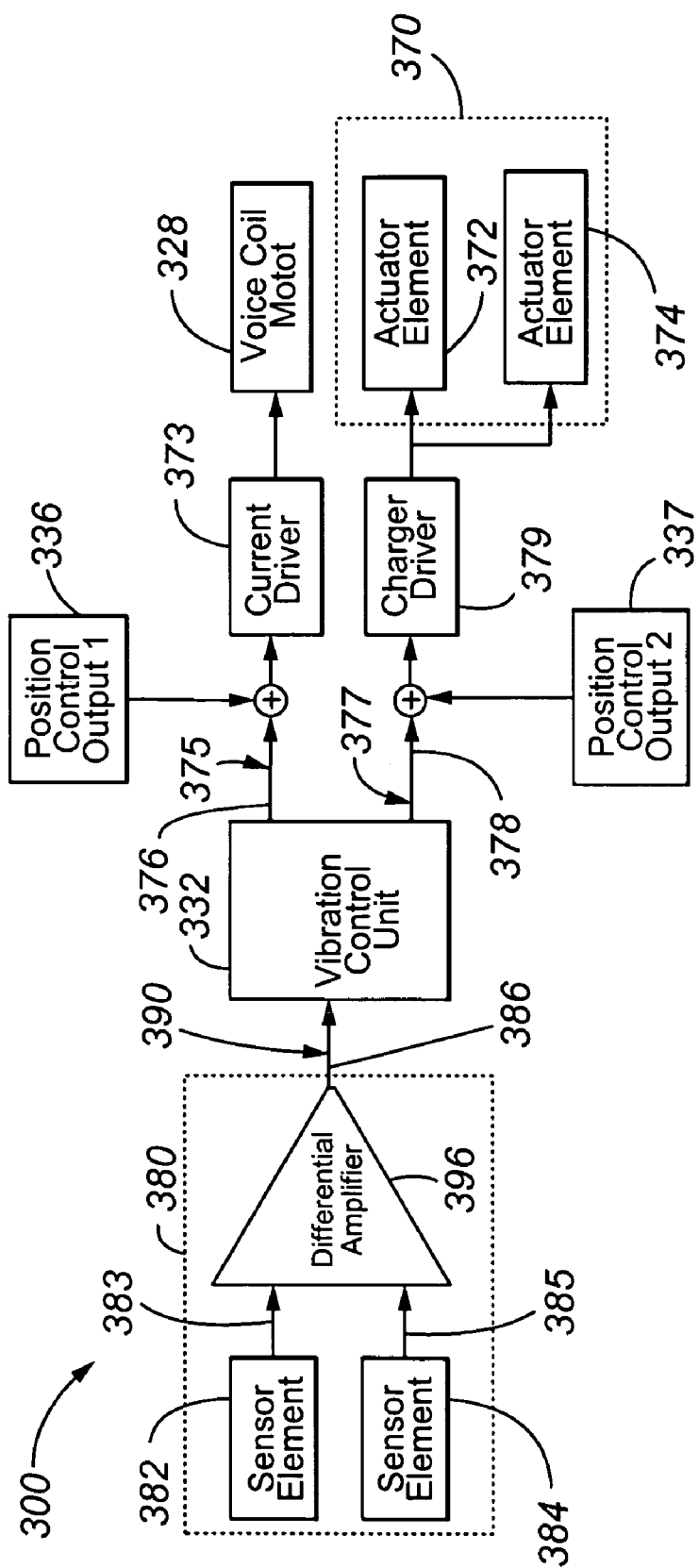
FIG. 6 shows a block diagram of one embodiment of a system for detecting vibration in a hard disk drive of the present invention and providing active control of resonance modes of the actuator assembly.

FIG. 6 shows a block diagram of one embodiment of a control system 300 for active control of vibration of the actuator assembly, such as vibration of an actuator arm and/or resonance modes of the components of the actuator assembly and other components of the disk drive. The control system 300 comprises a vibration control unit 332 that receives an input signal 390 from a piezoelectric sensor element 380 via a sensor signal line 386, and provides vibration control signals 375 and 377 to a voice coil motor 328 and a piezoelectric actuator element 370, respectively. The vibration control signals 375 and 377 are added to the position control output signals 336 and 337 via the actuator signal lines 376 and 378, respectively, to cancel or compensate for the detected vibration in driving the voice coil motor 328 and the piezoelectric actuator element 370.

The piezoelectric sensor element 380 comprises a pair of piezoelectric sensor films 382 and 384 and a differential amplifier 396. The differential amplifier 396 receives the first output signal 383 from the first piezoelectric sensor film 382 and the second output signal 385 from the second piezoelectric sensor film 384. From these input signals 383 and 385, the differential amplifier 396 provides an amplified differential signal 390 to the vibration control unit 332 via the sensor signal line 386.

The vibration control unit 332 receives the amplified differential signal 390 and adjusts the output levels to the voice coil motor 328 (i.e., for gross positioning of the actuator assembly) and to the piezoelectric actuator element 370 (i.e., for fine positioning of the actuator assembly) based on the input amplified differential signal 390 to cancel or compensate for the vibration of the actuator assembly and/or the piezoelectric actuator resonance modes. As shown in FIG. 6, the vibration control signals 375 and 377 are added to the position control output signals 336 and 337 via the actuator signal lines 376 and 378. The sum of the first vibration control signal 375 and the first position control output signal 336 is provided to a current driver 373 for driving the voice coil motor 328. Likewise, the sum of the second vibration control signal 377 and the second position control output signal 338 is provided to a charge driver 373 for driving the piezoelectric actuator films 372 and 374 of the piezoelectric actuator element 370.

Air turbulence excited structural vibration caused by disk rotation, for example, may result in lateral displacement of the head of the actuator assembly and be detected by the piezoelectric sensor element 380. The sensor output signal 390 correlates with the head lateral displacement. The vibration control unit 332 may attenuate the air turbulence excited vibration by controlling the voice coil motor 328 and the piezoelectric actuator films 372 and 372 of the piezoelectric actuator element 370 to counteract the lateral displacement. The vibration control unit 332, for example, may be implemented via an analog circuit or a digital control algorithm implemented on a digital signal processor.

Although the embodiments shown in FIGS. 1 through 6 show a differential sensor arrangement in which the signal of one element of the sensor is subtracted from the signal of another sensor element to cancel certain sensed vibration (e.g., out-of-plane mode vibration), a single sensor element may be used within the scope of the invention to detect vibrations, such as a shock imparted to a disk drive. In such an embodiment, the sensor may detect both in-plane and out-of-plane motion, and other actions may be taken (e.g., abort a write or read operation to prevent the disk drive from writing data to or reading data from a wrong location). Examples of shock detection and actuation taken in response to such a shock detection are disclosed in U.S. Pat. No. 6,744,577 entitled "Piezoelectric Actuator and Shock Sensor" and issued to Lin Guo et al. on Jun. 1, 2004, which is incorporated by reference in its entirety.

Figure 7:
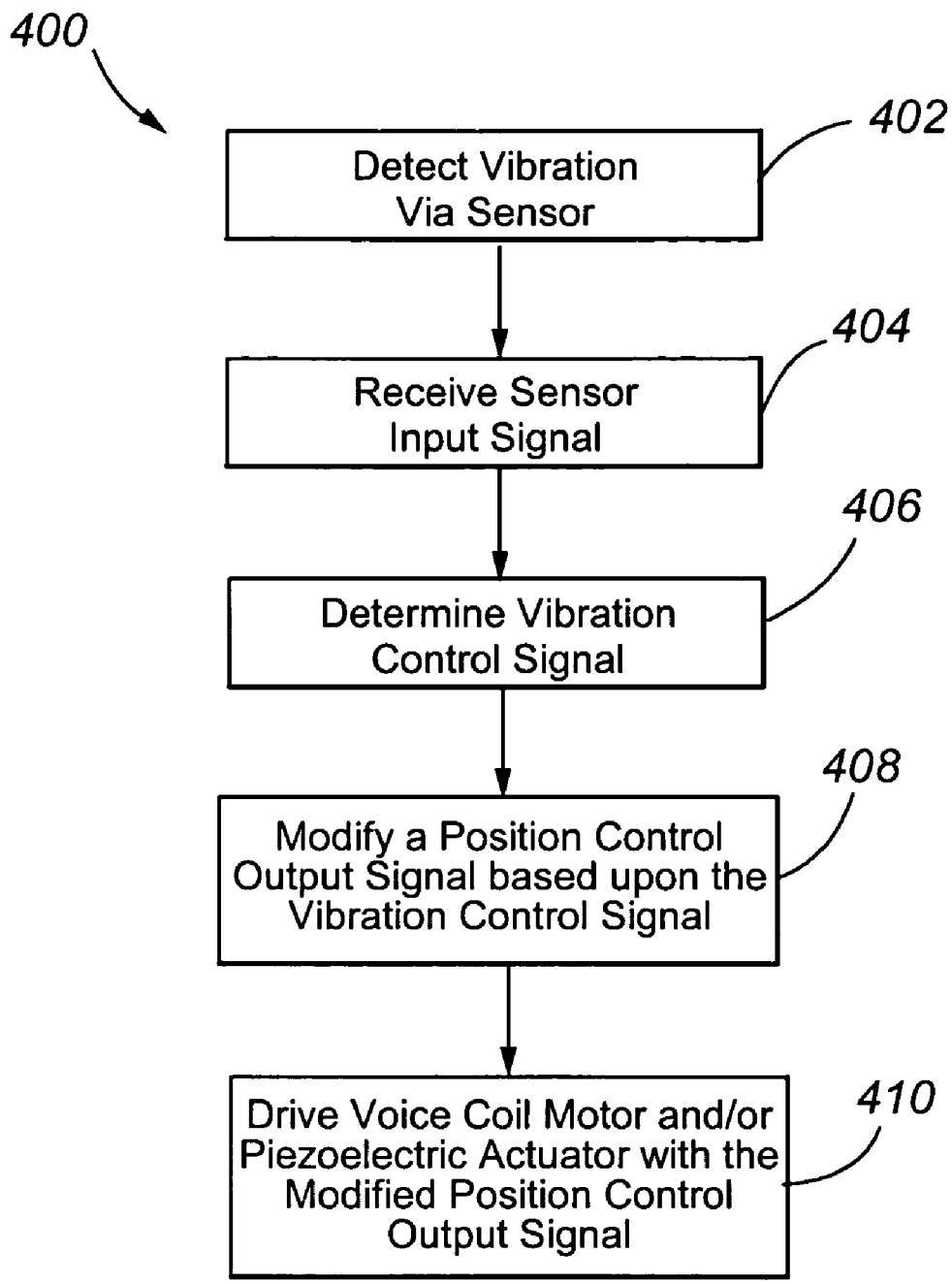
FIG. 7 shows a flow diagram of one embodiment of a method for controlling the positioning of a transducer head within a disk drive of the present invention.

FIG. 7 shows a flow diagram of a method 400 for controlling the positioning of a transducer head within a disk drive. In operation 402, a piezoelectric sensor element 380 detects a vibration in a hard disk drive. A sensor input signal 390 is received from the piezoelectric sensor element 380 by the vibration control unit 332 in operation 404. The sensor input signal 390, for example, may correspond to air turbulence excited structural vibration caused by disk rotation resulting in lateral displacement of the transducer head of the disk drive, and the sensor output signal 390 may correlate with the head lateral displacement.

A vibration control signal is determined by the vibration control unit 332 based upon the sensor input signal 390 received from the piezoelectric sensor element 380 in operation 406. The vibration control signal, for example, may correspond to an error signal for a voice coil motor 328 of the disk drive for gross positioning of the transducer head with respect to the disk and/or may correspond to an error signal for a piezoelectric actuator element 370 for fine positioning of the transducer head. The vibration control signal is then used to modify a position control output signal (e.g., added to or subtracted from the position control output signal 336, 337) in operation 408.

Finally, the modified position control output signal is used to drive the actuator assembly in operation 410. The modified position control output signal, for example, may be used to drive the voice coil motor 328 via a current driver 373 for positioning of the transducer head and/or the piezoelectric actuator element 370 via a charge driver 379 for positioning of the transducer head. The modified position control output signal may attenuate the vibration (e.g., air turbulence excited vibration) by controlling the voice coil motor 328 and/or the piezoelectric actuator films 372 and 372 of the piezoelectric actuator element 370 to counteract displacement caused by the sensed vibration.

Accordingly, embodiments of the present invention permit the detection of vibrations and correction of the transducer head position in response to such vibrations. In addition, embodiments of the present invention permit the detection of air turbulence excited vibrations using signals from the piezoelectric sensor element and suppression or correction of such vibrations by suitably controlling the voice coil motor and/or the piezoelectric actuator element.

Embodiments of the present invention can be used to modify the dynamic responses of the actuator assembly. More specifically, the resonance modes of the actuator assembly can be damped or attenuated, such that a higher track following servo control bandwidth can be attained with the improved dynamic responses of a dual-stage servo system. With higher servo control bandwidth, the head position can be controlled more accurately during track following control. In addition, embodiments of the present invention permit the detection of air turbulence excited vibrations using signals from the sensor elements and suppression or correction of such vibrations by suitably controlling the piezoelectric element and/or the voice coil motor. Suppression or correction of such vibrations is also made easier by collocating the sensor with the actuator near the transducer head so that the vibrations applied to the actuator and the transducer head are more accurately detected.

The preceding discussion of the invention has been presented for purposes of illustration and description. Further, the description is not intended to limit the scope of the invention to the embodiments described. Consequently, modifications and variations may be resorted to without departing from the spirit and scope of the invention as those skilled in the art readily understand. Such modifications and variations are considered to be within the purview and scope of the invention and the appended claims.

The functions of the various elements shown in the figures and described in the specification, include functional blocks labeled as "processors," "control units" or "controllers", may be provided through the use of dedicated hardware as well as hardware capable of executing software in association with appropriate hardware. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, with limitation, digital signal processor (DSP) hardware, read-only memory (ROM) for storing software, random access memory (RAM), and non-volatile storage. Other hardware, conventional and/or custom, may also be included.

In FIGS. 1-6, corresponding features between the Figures are numbered with similar final two digits (e.g., actuator assembly 16 in FIG. 1 corresponds to actuator assembly 116 in FIG. 2). Furthermore, one should understand that the drawings are not necessarily to scale and that graphic symbols, diagrammatic representatives and fragmentary use, in part, may illustrate the embodiment. In certain instances, the disclosure may not include details that are not necessary for an understanding of the present invention such as conventional details of fabrication and assembly.

What is claimed is:

1. A hard disk drive, comprising:
   at least one disk rotatable about an axis;
   an actuator assembly moveable relative to the disk;
   a transducer positioned on the actuator assembly;
   an actuator signal line;
   a processor;
   a piezoelectric actuator element disposed on the actuator assembly and electrically interconnected to the processor by the actuator signal line, wherein the piezoelectric actuator element is operable to move the at least one transducer relative to a surface of the disk;
   a sensor signal line; and
   a piezoelectric sensor element collocated with the piezoelectric actuator element for sensing a vibration, the piezoelectric sensor element being electrically interconnected to the processor by the sensor signal line, wherein the piezoelectric sensor element is electrically isolated from the piezoelectric actuator element, and wherein the piezoelectric actuator element and the piezoelectric sensor element comprise thin-film elements formed on a common substrate.

2. The hard disk drive of claim 1, wherein the piezoelectric actuator element and the piezoelectric sensor element comprise coplanar thin-film elements on the common substrate.

3. The hard disk of claim 1, wherein the piezoelectric actuator element and the piezoelectric sensor element comprise thin-film elements formed by a single layer of piezoelectric film on the common substrate.

4. The hard disk drive of claim 3, wherein the thin-film piezoelectric actuator element and the thin-film piezoelectric sensor element are isolated from each other by etching the single layer of piezoelectric film to form the thin-film piezoelectric actuator element and the thin-film piezoelectric sensor element.

5. The hard disk drive of claim 3, wherein the thin-film piezoelectric actuator element and the thin-film piezoelectric sensor element are isolated from each other by an isolation barrier disposed between the thin-film piezoelectric actuator element and the thin-film piezoelectric sensor element.

6. The hard disk drive of claim 1, wherein the piezoelectric actuator element and the piezoelectric sensor element comprise thin-film elements that are formed by different layers of piezoelectric film on the common substrate.

7. The hard disk drive of claim 6, wherein the different layers of piezoelectric film are separated by an isolation layer.

8. The hard disk drive of claim 1, wherein the piezoelectric actuator element comprises at least one piezoelectric actuator film and the piezoelectric sensor element comprises at least one piezoelectric sensor film.

9. The hard disk drive of claim 8, wherein the at least one piezoelectric actuator film and the at least one piezoelectric sensor film are disposed on different layers of piezoelectric film on the common substrate.

10. The hard disk drive of claim 8, wherein the at least one piezoelectric actuator film and the at least one piezoelectric sensor film comprise coplanar piezoelectric films disposed on the common substrate.

11. The hard disk drive of claim 8, wherein the at least one piezoelectric actuator film and the at least one piezoelectric sensor film are disposed in a common layer of piezoelectric film on the common substrate.

12. The hard disk drive of claim 1, wherein the piezoelectric actuator element comprises a first thin-film piezoelectric actuator film and a second thin-film piezoelectric actuator film.

13. The hard disk drive of claim 12, wherein the first thin-film piezoelectric actuator film and the second thin-film piezoelectric actuator film comprise coplanar layers of piezoelectric material disposed on the common substrate.

14. The hard disk drive of claim 12, wherein the first thin-film piezoelectric actuator film and the second thin-film piezoelectric actuator film are disposed in a common layer of piezoelectric material on the common substrate.

15. The hard disk drive of claim 12, wherein the first thin-film piezoelectric actuator film and the second thin-film piezoelectric actuator film are disposed in different layers of piezoelectric material on the common substrate.

16. The hard disk drive of claim 1, wherein the processor is operable to control the piezoelectric actuator element based upon a sensor signal received from the piezoelectric sensor element via the sensor signal line.

17. The hard disk drive of claim 1, wherein the processor is operable to determine if a shock imparted to the disk drive.

18. The hard disk drive of claim 17, wherein the processor is operable to interrupt an operation of the disk drive if the shock meets a predetermined threshold.

19. The hard disk drive of claim 18, wherein the operation comprises at least one of a write operation and a read operation.

20. The hard disk drive of claim 1, wherein the vibration comprises at least one of air turbulence excited vibration and resonant modes of vibration.

21. The hard disk drive of claim 1, wherein the processor is operable to actively control the vibration.

22. The hard disk drive of claim 21, wherein the processor is operable to compensate for the vibration.

23. The hard disk drive of claim 22, wherein the processor is operable to compensate for the vibration by modifying a position control signal with a vibration control signal.

24. The hard disk drive of claim 23, wherein the processor determines the vibration control signal based upon a sensor signal received via the sensor signal line.

25. The hard disk drive of claim 23, wherein the position control signal comprises a position control signal for at least one of a voice coil motor and the piezoelectric actuator element.

26. The hard disk drive of claim 1, wherein the piezoelectric actuator element is electrically interconnected to the actuator signal line via a charge driver circuit.

27. A method for detecting a vibration in a hard disk drive actuator assembly, the method comprising:
sending an actuation signal over a first signal line to control at least a first piezoelectric actuator element located on a first substrate for positioning a transducer head of a disk drive with respect to a disk of the disk drive;
receiving a sensor signal over a second signal line from at least a first piezoelectric sensor element located on said first substrate, wherein the at least a first piezoelectric sensor element is collocated with and electrically isolated from the at least a first piezoelectric actuator element;
determining, using the sensor signal, whether a vibration has been detected by the piezoelectric sensor element.

28. The method of claim 27, wherein the at least a first piezoelectric actuator element comprises a pair of piezoelectric actuator films.

29. The method of claim 27, wherein the at least a first piezoelectric sensor element comprises a pair of piezoelectric sensor films.

30. The method of claim 29, further comprising processing a first sensor signal produced by a first piezoelectric sensor of the pair of sensors and a second sensor signal produced by a second piezoelectric sensor of the pair of sensors to provide a differential sensor signal.

31. The method of claim 30, wherein the processing of the first and second sensor signals comprises subtracting the first sensor signal of a first piezoelectric sensor film from the second sensor signal of a second piezoelectric sensor film.

32. The method of claim 31, further comprising sending the differential signal over the second signal line.

33. The method of claim 30, wherein the step of processing results in a differential sensor signal corresponding to in-plane vibration of the actuator assembly.

34. The method of claim 30, wherein the step of processing comprises providing the differential sensor signal substantially void of out-of-plane vibration of the actuator assembly.

35. The method of claim 31, further comprising using a differential amplifier to subtract the first sensor signal from the second sensor signal and amplifying the resulting signal to obtain the differential sensor signal.

36. The method of claim 27, wherein controlling the at least a first piezoelectric actuator element comprises sending the actuation signal to a charge drive circuit.

37. The method of claim 27, wherein the vibration comprises a shock.

38. The method of claim 37, further comprising aborting a disk access operation upon a determination that a vibration has been detected.

39. The method of claim 27, wherein the operation of determining whether a vibration has been detected comprises comparing the sensor signal to a predetermined threshold.

40. The method of claim 27, further comprising modifying the actuation signal to compensate for the position of the transducer head with respect to the disk upon a determination that a vibration has been detected.

41. The method of claim 40, further comprising determining a position error signal utilizing the sensor signal.

42. The method of claim 27, further comprising determining a vibration control signal based upon the sensor signal.

43. The method of claim 42, further comprising modifying the actuation signal to compensate for the position of the head with respect to the disk based upon the vibration control signal.

44. The method of claim 43, wherein modifying the actuation signal comprises adding the vibration control signal to the actuation signal.

45. The method of claim 43, wherein modifying the actuation signal comprises subtracting the vibration control signal from the actuation signal.

46. The method of claim 43, further comprising providing the modified actuation signal to a current drive circuit to control a voice coil motor.

47. The method of claim 43, further comprising providing the modified actuation signal to a charge drive circuit to control the piezoelectric actuator element.

48. A hard disk drive comprising:
means for storing data comprising at least one disk rotatable about an axis;
means for reading data from and writing data to the means for storing data;
means for moving and for placing the means for reading data from and writing data to the disk in a selected location relative to a surface of the means for storing data including piezoelectric actuator means for effecting movement;
means for sensing a vibration comprising piezoelectric sensor means, wherein the
piezoelectric actuator means and the piezoelectric sensor means are collocated on a single substrate;
means for processing and generating control signals;
first means for electrically interconnecting the means for processing and generating control signals to the piezoelectric sensor means; and
second means for electrically interconnecting the means for processing and generating control signals to the piezoelectric actuator means,
wherein the first and second means are electrically isolated from each other.

49. A method of making a data storage actuator assembly, comprising:
providing an actuator comprising:
a first portion;
a second portion; and
a data read/write element mounted to the second portion;
forming a piezoelectric actuator element on a first substrate;
forming a piezoelectric sensor element on said first substrate, wherein the piezoelectric actuator element is electrically isolated from the piezoelectric sensor element; and
mounting the first substrate to the actuator, such that the piezoelectric actuator element is configured to move the second portion relative to the first portion.

50. The method of claim 49, wherein the piezoelectric actuator element comprises first and second thin-film piezoelectric actuator elements, the method further comprising positioning the first and second thin-film piezoelectric actuator elements on the first substrate.

51. The method of claim 50, wherein positioning the first and second thin-film piezoelectric actuator elements on the first substrate comprises positioning the first and second thin-film piezoelectric actuator elements in a coplanar relationship.

52. The method of claim 50, wherein positioning the first and second thin-film piezoelectric actuator elements on the first substrate comprises depositing the first and second thin-film piezoelectric actuator elements on the first substrate as a single film layer.

53. The method of claim 50, further comprising electrically isolating the first and second thin-film piezoelectric actuator elements via an isolation barrier.

54. The method of claim 50, further comprising electrically isolating the first and second thin-film piezoelectric actuator elements on different layers on the first substrate.

55. The method of claim 49, wherein the piezoelectric actuator element and the piezoelectric sensor element comprise a single layer of piezoelectric film and wherein the piezoelectric actuator element and the piezoelectric sensor element are electrically isolated from one another by etching the single layer of piezoelectric film.

56. The method of claim 49, wherein the piezoelectric actuator element and the piezoelectric sensor element are electrically isolated from one another by placing an isolation barrier between the piezoelectric actuator element and the piezoelectric sensor element.

57. A data storage actuator assembly, comprising:
an actuator, comprising:
   a first portion;
   a second portion, and
   a data read/write element mounted to the second portion; and
a piezoelectric actuator and sensor assembly, comprising:
   a first substrate mounted to the actuator;
   a piezoelectric actuator element disposed on the first substrate and configured to move the second portion relative to the first portion;
   a piezoelectric sensor element disposed on the first substrate, wherein the
piezoelectric actuator element and the piezoelectric sensor element are electrically isolated;
   an actuation signal line interconnected to the piezoelectric actuator element; and
   a sensor signal line interconnected to the piezoelectric sensor element.

58. The assembly of claim 57, wherein the piezoelectric actuator element includes a pair of piezoelectric sensor films.

59. The assembly of claim 57, wherein the piezoelectric sensor element includes a pair of piezoelectric sensor films.

* * * * *